US012394906B2

(12) United States Patent
Frank

(10) Patent No.: US 12,394,906 B2
(45) Date of Patent: Aug. 19, 2025

(54) CIRCULAR PATCH ANTENNA WITH INTEGRATED ARC SLOTS

(71) Applicant: TAOGLAS GROUP HOLDINGS LIMITED, Enniscorthy (IE)

(72) Inventor: Patrick Carl Frank, Farmington, MN (US)

(73) Assignee: Taoglas Group Holdings Limited, Enniscorthy (IE)

( * ) Notice: Subject to any disclaimer, the term of this patent is extended or adjusted under 35 U.S.C. 154(b) by 0 days.

(21) Appl. No.: 18/751,583

(22) Filed: Jun. 24, 2024

(65) Prior Publication Data

US 2024/0429612 A1 Dec. 26, 2024

Related U.S. Application Data

(63) Continuation of application No. 17/947,422, filed on Sep. 19, 2022, now Pat. No. 12,021,318.

(60) Provisional application No. 63/246,663, filed on Sep. 21, 2021.

(51) Int. Cl.
*H01Q 9/04* (2006.01)

(52) U.S. Cl.
CPC ......... *H01Q 9/0428* (2013.01); *H01Q 9/0414* (2013.01)

(58) Field of Classification Search
CPC ..... H01Q 9/0407–045; H01Q 1/38–48; H01Q 21/065
See application file for complete search history.

(56) References Cited

U.S. PATENT DOCUMENTS

| | | | | |
|---|---|---|---|---|
| 5,003,318 | A * | 3/1991 | Berneking | H01Q 9/0414 343/700 MS |
| 7,427,957 | B2 | 9/2008 | Rafi et al. | |
| 11,417,961 | B2 * | 8/2022 | Hautcoeur | H01Q 9/0485 |
| 2017/0033461 | A1 | 2/2017 | Jasebi et al. | |
| 2022/0352636 | A1 | 11/2022 | Yetisir | |

* cited by examiner

*Primary Examiner* — Hasan Islam
(74) *Attorney, Agent, or Firm* — Garson & Gutierrez, PC

(57) ABSTRACT

Circular patch antenna with integrated arc slots. In one embodiment, the circular patch antenna includes a top dielectric patch and a bottom dielectric patch. The top dielectric patch includes a first plurality of apertures while the bottom dielectric patch includes a second plurality of apertures. At least a portion of the first plurality of apertures and the second plurality of apertures are aligned with one another when the top dielectric patch is positioned over the bottom dielectric patch. A flex printed circuit board (PCB) is positioned between the top dielectric patch and the bottom dielectric patch and includes a plurality of arc slots, each of the plurality of arc slots are positioned between the first and second plurality of apertures and an external periphery of the flex PCB. Methods of operating the circular patch antenna as well as systems that incorporate the circular patch antenna are also disclosed.

20 Claims, 6 Drawing Sheets

CIRCULAR PATCH ANTENNA WITH INTEGRATED ARC SLOTS

CROSS-REFERENCE TO RELATED APPLICATIONS

This application is a continuation of, and claims the benefit of priority to, U.S. patent application Ser. No. 17/947,422 filed Sep. 19, 2022, of the same title, which claims the benefit of priority to U.S. Provisional Patent Application Ser. No. 63/246,663 filed Sep. 21, 2021, of the same title, the contents of each of the foregoing being incorporated herein by reference in its entirety.

FIELD

The present disclosure relates generally to circular patch antennas, and more particularly in one exemplary aspect to circular patch antennas for use with global navigation satellite system (GNSS) frequency bands.

BACKGROUND

Traditionally, antenna designs for use with GNSS frequency bands often utilize ceramic based materials to meet the performance-based requirements for these operating bands. However, these ceramic based materials are relatively heavy making there use less than desirable in applications in which mass is a design constraint. Additionally, ceramic based materials are relatively brittle which makes there use with, for example, unmanned aerial vehicles (UAVs) less than desirable. Accordingly, ongoing trends in the development of antennas for use with, for example, UAVs has required the use of non-traditional materials that: (1) are lighter in weight to, inter alia, maximize the battery life for these UAVs; and (2) have increased impact-resistance, to improve the reliability of the antenna design. As a result, new technologies that address the deficiencies of prior ceramic-based antenna designs are now needed.

SUMMARY

The present disclosure satisfies the foregoing needs by providing, inter alia, methods, apparatus and systems for the implementation of circular patch antennas that address some or all of the deficiencies recognized above.

In one aspect, a circular patch antenna is disclosed. In one embodiment, the circular patch antenna includes a first dielectric patch having a first plurality of apertures; a second dielectric patch having a second plurality of apertures, at least a portion of the first plurality of apertures and the second plurality of apertures being aligned with one another when the first dielectric patch is positioned with the second dielectric patch; and a metallization that is positioned between the first dielectric patch and the second dielectric patch, the metallization including a plurality of arc slots, each of the plurality of arc slots being positioned between the first and second plurality of apertures and an external periphery of the metallization.

In one variant, the metallization includes two distinct flexible printed circuit boards.

In another variant, the second dielectric patch includes a plurality of slots organized into a plurality of groupings of slots.

In yet another variant, a portion of the plurality of slots are positioned between one of the first plurality of apertures and one of the second plurality of apertures.

In yet another variant, the plurality of groupings of slots includes a first grouping of slots and a second grouping of slots that is disposed adjacent the first grouping of slots, wherein a first arc slot of the plurality of arc slots covers a portion of the first grouping of slots and a portion of the second grouping of slots.

In yet another variant, the first dielectric patch further includes an inner ring that is positioned about the first plurality of apertures.

In yet another variant, the first dielectric patch further includes an intermediate ring that is positioned between the first plurality of apertures and the second plurality of apertures.

In yet another variant, the first dielectric patch further includes one or more outer rings, the one or more outer rings being positioned between the second plurality of apertures and an outer periphery of the first dielectric patch.

In yet another variant, the first dielectric patch and the second dielectric patch include disk-like profiles for an external periphery of the first dielectric patch and the second dielectric patch.

In yet another variant, the first dielectric patch and the second dielectric patch each include one or more alignment features that provide alignment between the first dielectric patch and the second dielectric patch when mounted with one another.

In yet another variant, the circular patch antenna further includes a top metallization that is disposed atop the first dielectric patch, the top metallization including a plurality of arc slots.

In yet another variant, the circular patch antenna further includes a first plurality of solder pins and a second plurality of solder pins, the first plurality of solder pins being received through both the first dielectric patch and the second dielectric patch, while the second plurality of solder pins is received within the second dielectric patch, but not the first dielectric patch.

In yet another variant, the circular patch antenna further includes a bottom metallization that is disposed below the second dielectric patch.

In yet another variant, the two distinct flexible printed circuit boards positioned between the first dielectric patch and the second dielectric patch, the top metallization that is disposed atop the first dielectric patch and the bottom metallization that is disposed below the second dielectric patch each comprise a circular outer profile.

In another embodiment, the circular patch antenna includes a first dielectric patch having a first plurality of apertures and a second plurality of apertures that are disposed between the first plurality of apertures and an external periphery for the first dielectric patch; a second dielectric patch having a third plurality of apertures and a fourth plurality of apertures, the first plurality of apertures being aligned with the third plurality of apertures and the second plurality of apertures being aligned with the fourth plurality of apertures when the first dielectric patch is mounted on the second dielectric patch; and a metallization that is positioned between the first dielectric patch and the second dielectric patch, the metallization including a plurality of arc slots, each of the plurality of arc slots being positioned between the first and second plurality of apertures and an external periphery of the metallization.

In one variant, the second dielectric patch includes a plurality of slots organized into a plurality of groupings of slots.

In another variant, a portion of the plurality of slots are positioned between one of the first plurality of apertures and one of the second plurality of apertures.

In yet another variant, the plurality of groupings of slots includes a first grouping of slots and a second grouping of slots that is disposed adjacent the first grouping of slots, wherein a first arc slot of the plurality of arc slots covers a portion of the first grouping of slots and a portion of the second grouping of slots.

In yet another variant, the metallization comprises two distinct metallizations.

In yet another variant, the circular patch antenna further includes a top metallization that is positioned atop the first dielectric patch, the top metallization including a plurality of arc slots that are aligned with the plurality of arc slots located on the two distinct metallizations positioned between the first dielectric patch and the second dielectric patch.

In another aspect, systems that incorporate the aforementioned circular patch antennas are disclosed.

In yet another aspect, methods of manufacturing the aforementioned circular patch antennas are disclosed.

Other features and advantages of the present disclosure will immediately be recognized by persons of ordinary skill in the art with reference to the attached drawings and detailed description of exemplary implementations as given below.

BRIEF DESCRIPTION OF DRAWINGS

The features, objectives, and advantages of the present disclosure will become more apparent from the detailed description set forth below when taken in conjunction with the drawings, wherein.

All Figures disclosed herein are @ Copyright 2021-2022 Taoglas Group Holdings Limited. All rights reserved.

DESCRIPTION

Detailed descriptions of the various embodiments and variants of the apparatus and methods of the present disclosure are now provided. It is noted that wherever practicable similar or like reference numbers may be used in the figures and may indicate similar or like functionality. The figures depict embodiments of systems, circular patch antennas, or methods for purposes of illustration only. One skilled in the art will readily recognize from the following description that alternative embodiments of the structures and methods illustrated herein may be employed without necessarily departing from the principles described herein.

Exemplary Circular Patch Antenna—

Ongoing trends in the development of antennas for use with, for example, unmanned aerial vehicles (UAVs) has resulted in the development of non-traditional materials that: (1) are lighter in weight, to maximize the battery life for these UAVs; and (2) have increased impact-resistance, to improve the reliability of the antenna design. More recently, the assignee of the present disclosure has implemented a polymer dielectric substance fortified with ceramic particles that is utilized as an alternative to heavier and more brittle ceramics that have traditionally been used in these antenna designs. These polymer dielectric materials have been marketed under the name TERRABLAST® and are more than 30% lighter than traditional ceramic antenna technologies and are impact resistant to withstand drops, falls and impacts making it ideal for applications such as, for example, UAVs, where the antenna's mechanical robustness following potential impacts is critical. This polymer dielectric material also has broader utility outside of antenna designs for use with UAV applications.

Referring now to FIGS. 1A-1F, an exemplary circular patch antenna 100 is shown and described in detail. The circular patch antenna 100 may be utilized as a GNSS patch antenna with sufficient frequency bandwidth to cover all L-band GNSS frequencies, while remaining manufacturable and relatively small-sized. Additionally, the resonant frequency of the circular patch antenna 100 may be reduced without sacrificing its phase and polarization performance characteristics. Additionally, through its incorporation of the aforementioned polymer dielectric material, the effective dielectric constant of the patch dielectric may be altered with geometric design changes to the underlying circular patch antenna 100 design while also improving upon its manufacturability and minimizing mass.

Figure 1A:
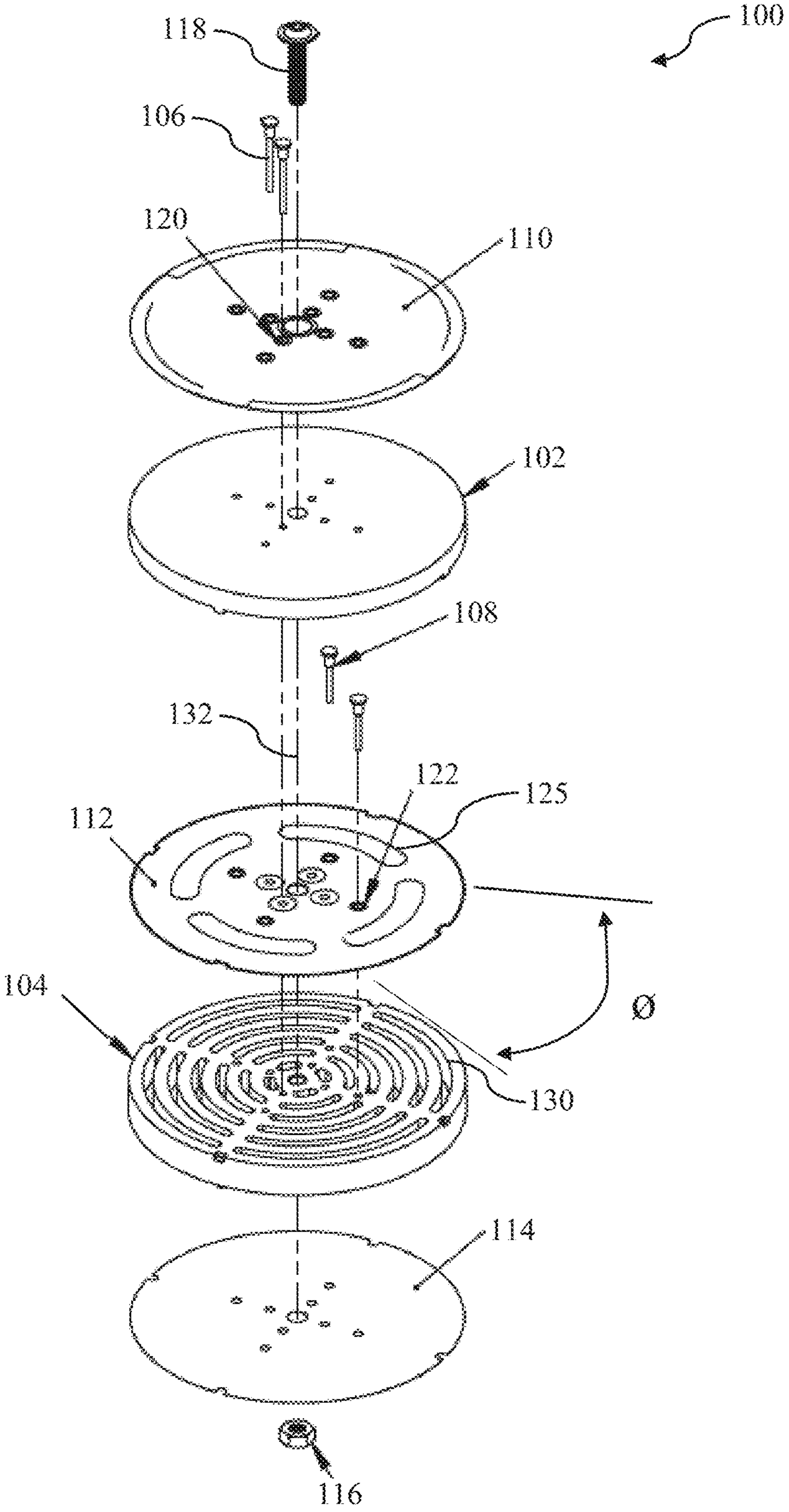
FIG. 1A is an exploded perspective view of a circular patch antenna, in accordance with the principles of the present disclosure.

FIG. 1A is an exploded perspective view of a circular patch antenna 100 illustrating the various components that make up one exemplary antenna design. The circular patch antenna 100 may include a top dielectric patch 102 as well as a bottom dielectric patch 104 that may be manufactured from the aforementioned polymer dielectric fortified with ceramic particles. In some implementations, the top dielectric patch 102 and/or the bottom dielectric patch 104 may be manufactured from a ceramic or may be manufactured using other types of known dielectric materials. The circular patch antenna 100 may also incorporate a plurality of distinct flexible printed circuit boards (PCBs). For example, these flexible PCBs may include a top patch flex PCB 110 that is positioned atop the top dielectric patch 102, one or more middle patch flex PCB(s) 112, 134 that are positioned between the top dielectric patch 102 and the bottom dielectric patch 104, as well as a bottom ground flex PCB 114 that is positioned underneath the bottom dielectric patch 104. These flex PCBs 110, 112, 134, 114 may be manufactured from a polyimide material. The top flex PCB 110 may form the top patch metallization for the circular patch antenna 100. One or more of the middle flex PCBs 112, 134 may form the middle patch metallization for the circular patch antenna 100. Additionally, the use of two distinct middle flex PCBs 112, 134 may serve to stabilize the performance of, for example, the top dielectric patch 102 across distinct circular patch antennas 100. The bottom flex PCB 114 may form a ground plane for the circular patch antenna 100 that may stabilize the performance of the circular patch antenna 100 when the circular patch antenna 100 is mounted on, for example, non-planar or imperfectly planar surfaces. Although, the use of flexible PCBs 110, 112, 134, 114 for the circular patch antenna 100 is exemplary and may be desirable in instances in which design constraints on the overall height of the circular patch antenna 100 dictate their usage, it would be readily appreciated by one of ordinary skill given the contents of the present disclosure that alternative implementations may utilize other types of traditional substrate materials including, for example, substrates made from FR-4, or other types of metallizations and substrate materials.

The circular patch antenna 100 may also include one or more solder pins 106, 108. As shown in FIG. 1A, the total number of solder pins 106, 108 shown is four (4) to create a dual-feed circular patch antenna 100, although it would be readily apparent to one of ordinary skill given the contents of the present disclosure that the number of solder pins 106, 108 may be varied dependent upon specific design constraints. For example, a quad-feed circular patch antenna 100 may include eight (8) solder pins 106, 108. In some implementations, solder pins 106 may have a different length than solder pins 108. For example, solder pins 106 may have a length of fifteen (15) mm, while solder pins 108 may have a length of eleven (11) mm. The difference in solder pin length may be necessary as some of these solder pins 106 may have to pass through both the top dielectric patch 102 and bottom dielectric patch 104, while other ones of these solder pins 108 only need to pass through the bottom dielectric patch 104.

Figure 1B:
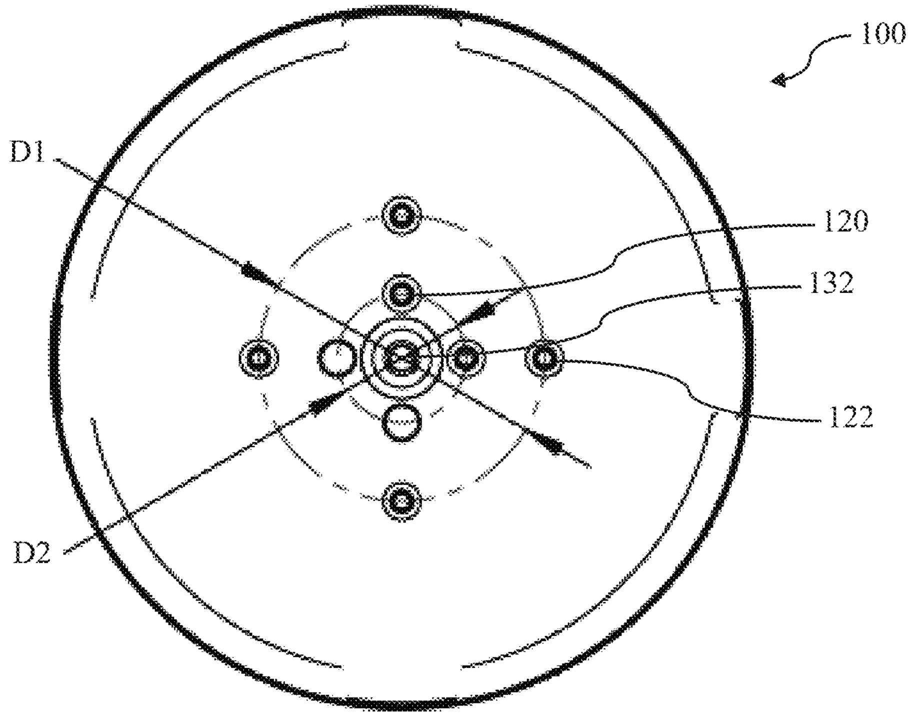
FIG. 1B is a top plan view of the circular patch antenna of FIG. 1A, in accordance with the principles of the present disclosure.

As a brief aside, and referring to FIG. 1B, the feed apertures 120, 122 as shown on the top of the circular patch antenna 100 are shown and described in detail. The inner feed apertures 120 are positioned about the centerline 132 of the circular patch antenna 100 at a diameter D2. The outer feed apertures 122 are positioned about the centerline 132 of the circular patch antenna 100 at a diameter D1. In some implementations, solder pins 106 may be received within respective ones of the inner feed apertures 120, while solder pins 108 may be received within respective ones of the outer feed apertures 122, albeit underneath the top dielectric patch 102 as shown in FIG. 1A. However, in some implementations, this arrangement may be reversed such that solder pins 106 may be received within respective ones of the outer feed apertures 122, while solder pins 108 may be received within respective ones of the inner feed apertures 120. Referring now to FIG. 1D, solder pins 106 pass through the top flex PCB 110, the top dielectric patch 102, through both the middle flex PCBs 112, 134, the bottom dielectric patch 104, and the bottom flex PCB 114. In some implementations, solder pins 108 are positioned atop the lower flex PCB 134 where they protrude therethrough, before passing through the bottom dielectric patch 104, and the bottom flex PCB 114. In some implementations, solder pins 108 do not pass through both of the middle flex PCBs 112, 134; rather they only pass through the lower middle flex PCB 134. Referring again to FIG. 1A, the circular patch antenna 100 may also be secured to an end user PCB (200, FIG. 1D) via use of a threaded screw 118 and a nut 116. The threaded screw 118 may be received in an aperture (202, FIG. 1D) located on the end user PCB (200, FIG. 1D). However, in some implementations the use of the screw 118 and nut 116 may be obviated in favor of other attachment means such as a solder connection made to the solder pins 106, 108. In some variants, an external cover (not shown), adhesive, tape or other attachment mechanism may be utilized to hold the various components of the circular patch antenna 100 together.

Figure 1C:
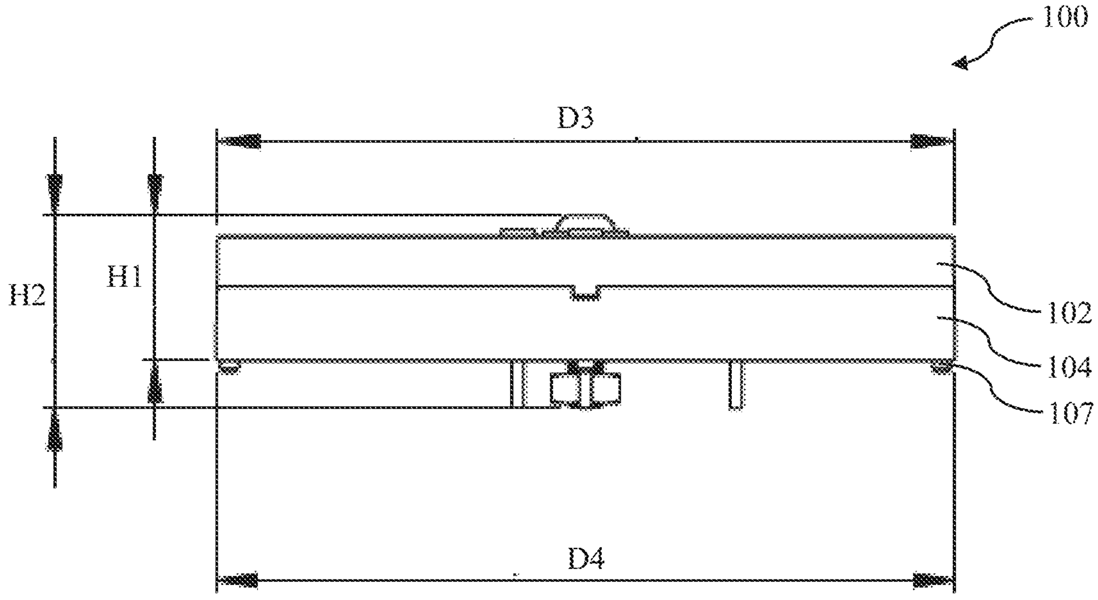
FIG. 1C is a front plan view of the circular patch antenna of FIG. 1A, in accordance with the principles of the present disclosure.
Figure 1D:
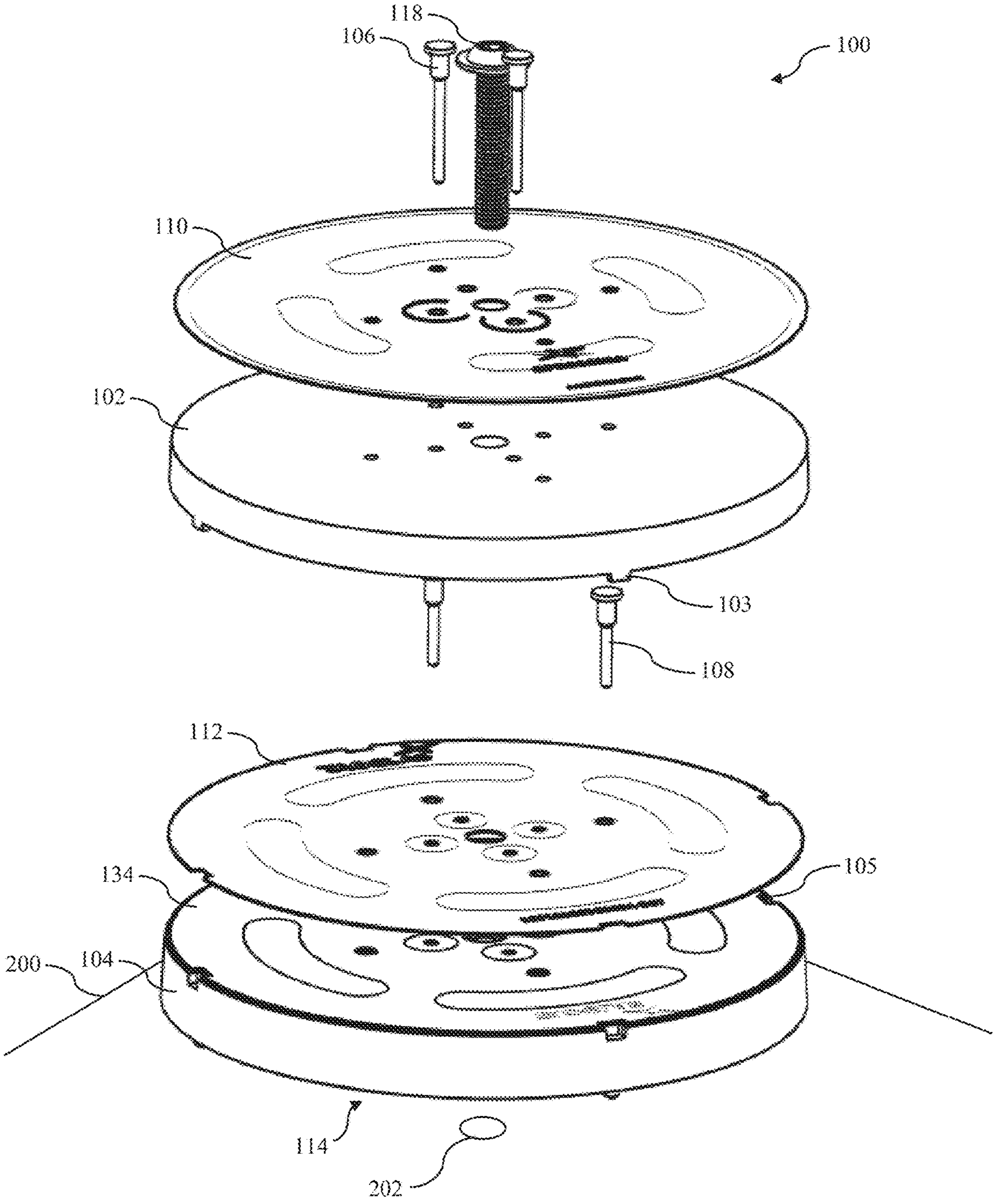
FIG. 1D is an exploded top perspective view of the circular patch antenna of FIG. 1A, in accordance with the principles of the present disclosure.
Figure 1E:
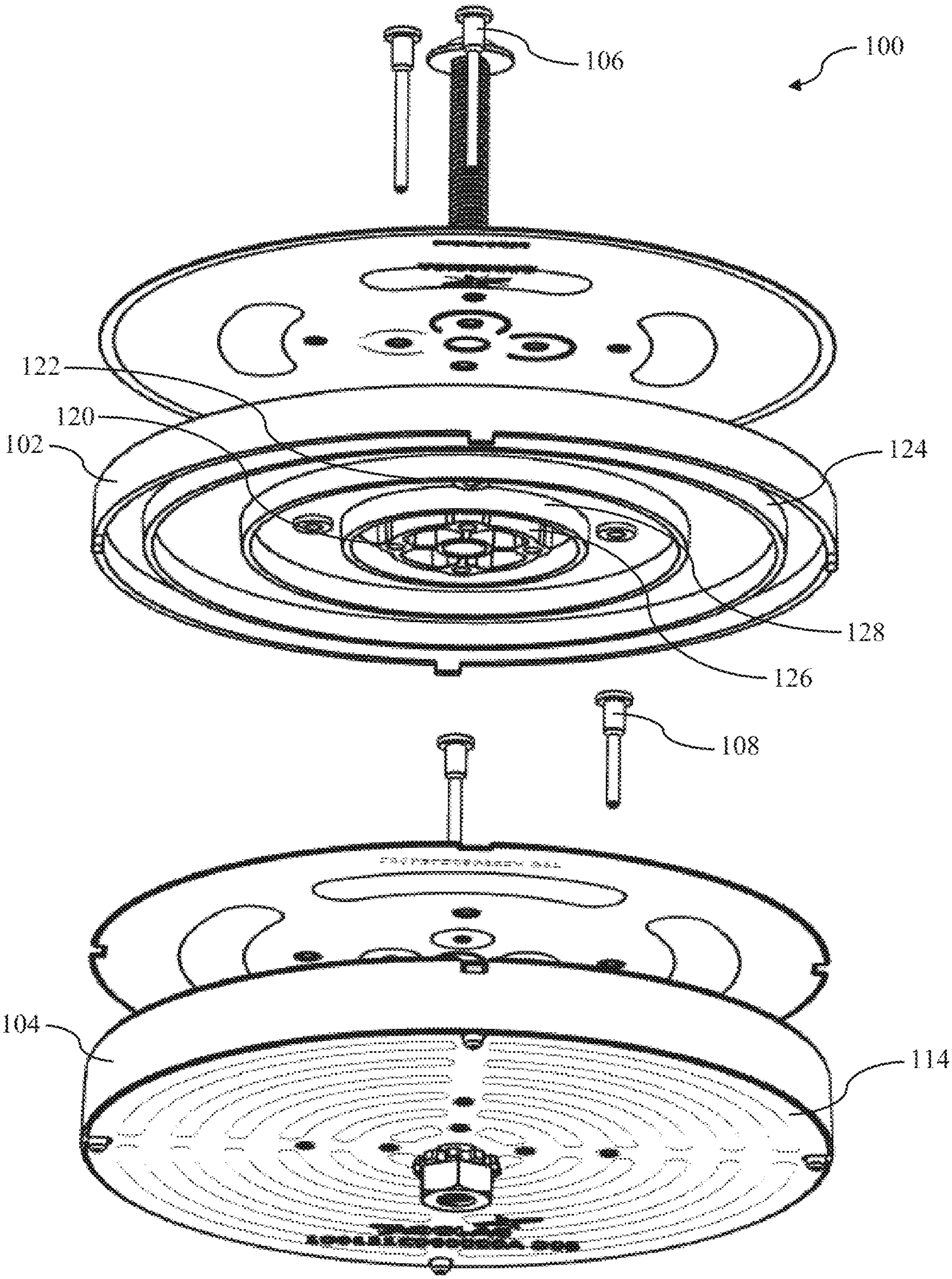
FIG. 1E is an exploded bottom perspective view of the circular patch antenna of FIG. 1A, in accordance with the principles of the present disclosure.
Figure 1F:
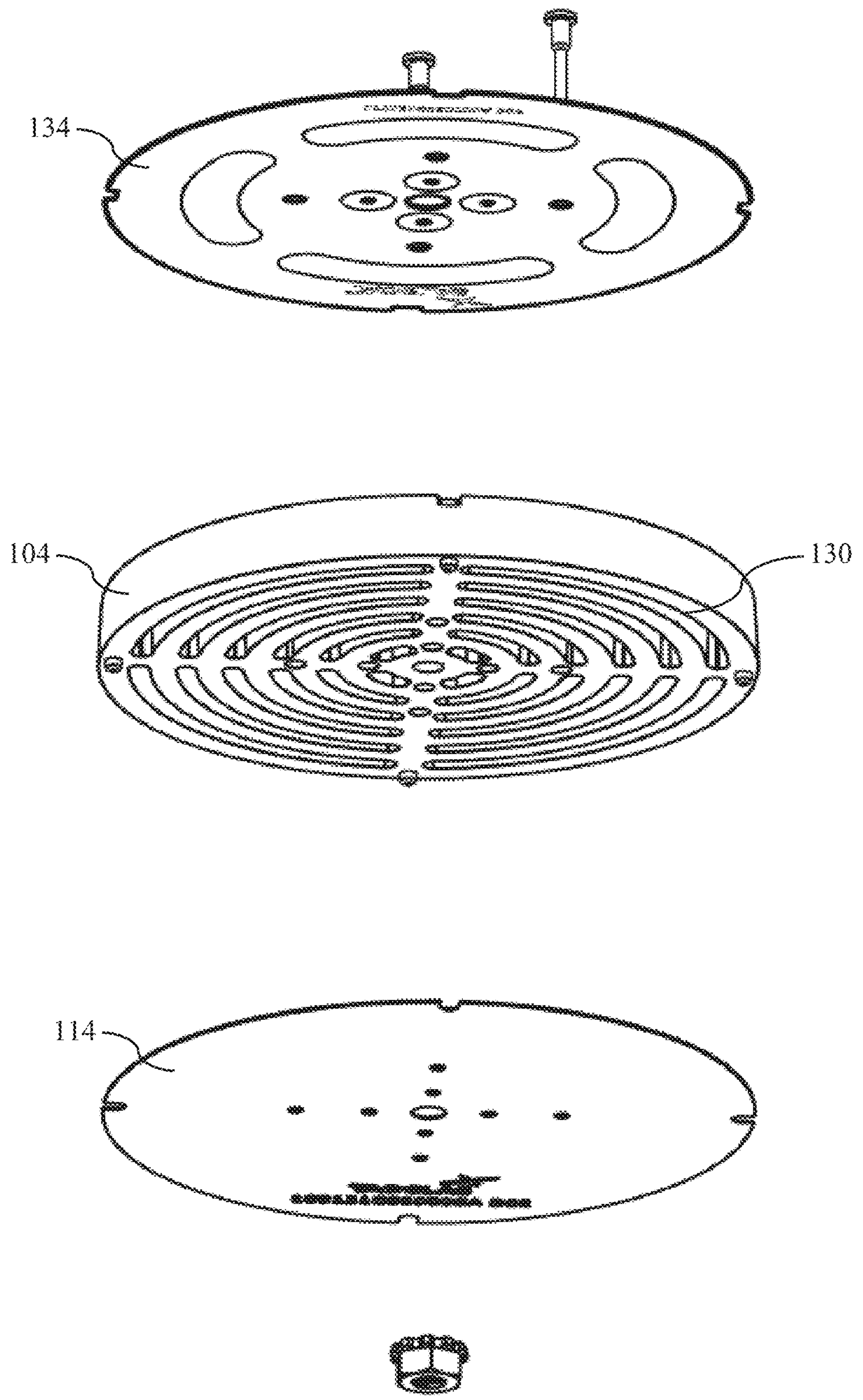
FIG. 1F is an exploded bottom perspective view of the bottom dielectric patch of the circular patch antenna of FIG. 1A, in accordance with the principles of the present disclosure.
Figure 2:
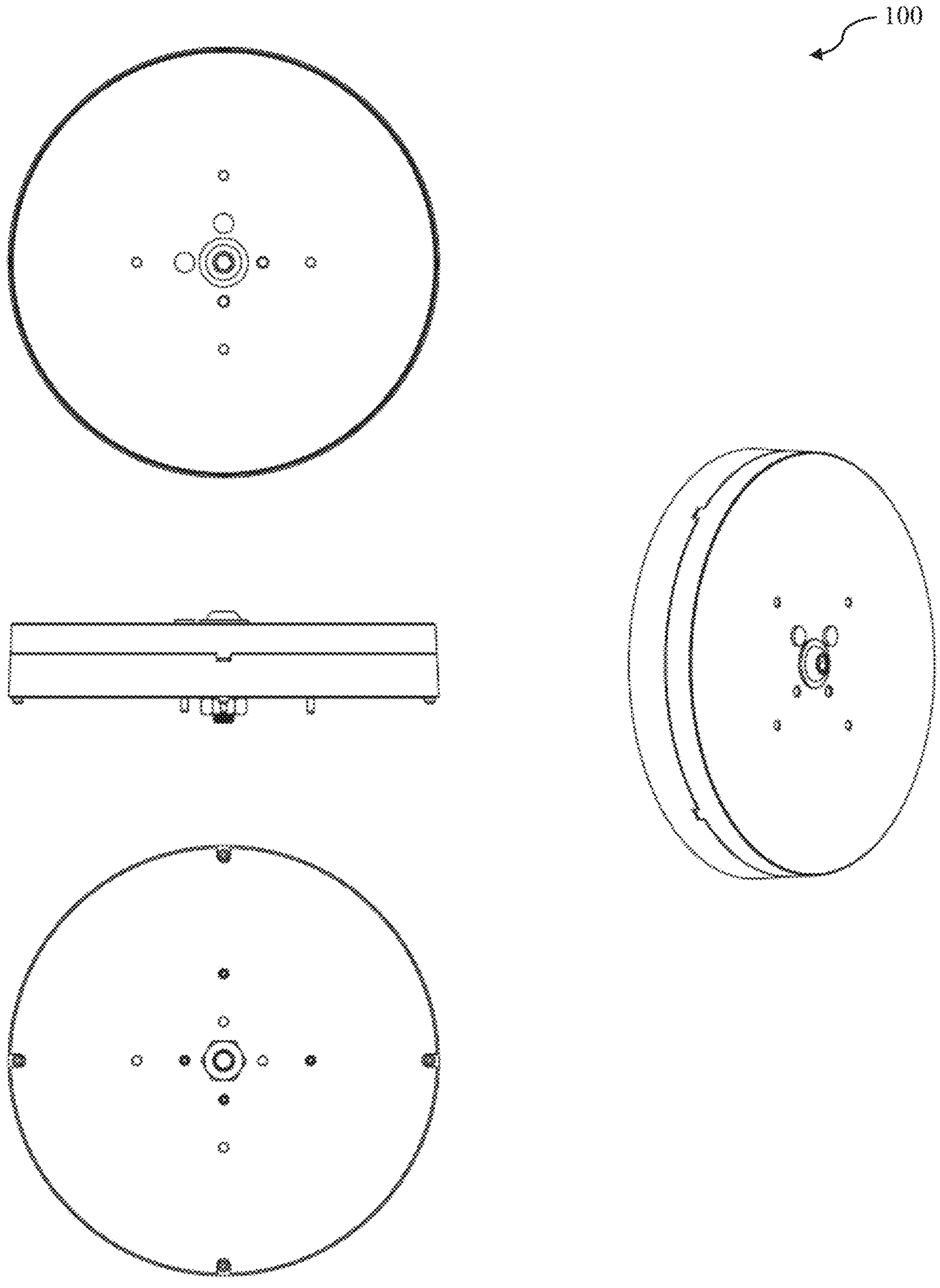
FIG. 2 are front, top, bottom, and isometric views of the circular patch antenna of FIGS. 1A-1F, in accordance with the principles of the present disclosure.

Referring now to FIGS. 1A and 1F, the bottom dielectric patch 104 includes a plurality of slots 130 that are positioned between each of the feed apertures 120, 122. As illustrated in FIGS. 1A and 1F, the circular patch antenna 100 includes four (4) inner feed apertures 120 and four (4) outer feed apertures 122 and accordingly includes four (4) sets of slots 130, although it would be appreciated that the number of sets of slots 130 could be greater than four (4) in some implementations, or less than four (4) in other implementations. Also, as shown in FIGS. 1A and 1F, each set of slots 130 consists of six (6) distinct slots 130 that increase in length as the slots 130 are positioned further away from the centerline 132 of the circular patch antenna 100. The precise number of distinct slots 130 in each set of slots 130 may be more than (or less than) the number six (6) in some implementations.

The middle flex PCB(s) 112, 134 may also include a set of arc-slots 125 that may be positioned between the outer perimeter of the respective middle flex PCB 112, 134 and the apertures 120, 122. Each arc-slot 125 is defined by an arc angle ø and by increasing the arc angle ø, the resonant frequency of the circular patch antenna 100 decreases. Conversely, by decreasing the arc angle ø, the resonant frequency of the circular patch antenna 100 increases. Accordingly, the circular patch antenna 100 may be tuned to a designated frequency without necessarily requiring that the outer diameter of the circular patch antenna 100 be increased (or decreased). The sets of arc-slots 125 may be symmetrical with respect to the centerline 132 of the circular patch antenna 100 to minimize phase variations across frequency and space when the circular patch antenna 100 is driven for circular polarization. Each of the arc-slots 125 may be positioned such that the apertures 120, 122 bisect each of the arc-slots 125. As shown in FIG. 1A, the arc-slots 125 are offset from the slots 130 located on the bottom dielectric patch 104. In some implementations, the top flex PCB 110 may include arc-slots 125 in addition to, or alternatively than, the arc-slots 125 that may (or may not) exist in the middle flex PCB(s) 112, 134.

As a brief aside, prior patch antennas typically have been manufactured to include a solid top surface to support a metallization process (typically, a sintered silver paste). However, by removing the requirement that the patch antenna have a solid top surface, as shown for the bottom dielectric patch 104, and using regularly spaced vertical walls without a solid top or bottom surface, a dielectric loading for the bottom dielectric patch 104 can be provided that roughly corresponds to the fill ratio of the dielectric to vacuum multiplied by the dielectric constant of the underlying dielectric material. Accordingly, by using these vertical walls, the effective dielectric constant of the bottom dielectric patch 104 is higher than it otherwise would be without these vertical walls. Additionally, by removing mass from the bottom dielectric patch 104, the dielectric loading to mass ratio is also improved. The use of these vertical walls also improves upon the manufacturability of these types of patch antennas when using composite (polymer) materials that are formed using an injection molding process. The reason for this is due to the difficulty of injection molding large flat surfaces, as the product will tend to cool unevenly after the injection molding process, resulting in random areas of sink and an uneven surface. However, by incorporating narrow even-thickness walls in the bottom dielectric patch 104, the potential for material sink due to uneven cooling is minimized, thereby improving product yield during the manufacturing process as compared with an injection molded dielectric with large solid flat surfaces.

Referring now to FIG. 1E, the underside of the top dielectric patch 102 is best illustrated. The top dielectric patch 102 may include an inner ring 126 that is positioned symmetrically about the inner feed apertures 120. The top dielectric patch 102 may also include an intermediate ring 128 that is positioned between the inner feed apertures 120 and the outer feed apertures 122. The top dielectric patch 102 may also include one or more outer rings 124 that are positioned outside of the outer feed apertures 122. As illustrated in FIG. 1E, the number of outer rings 124 is one (1), although the number of these outer rings 124 may be greater than one (1) in some implementations. In some implementations, the top dielectric patch 102 may include a geometry that is similar to the bottom dielectric patch 104 that includes the plurality of sets of slots 130. In another implementation, the bottom dielectric patch 104 may include the geometric features of the top dielectric patch 102 as shown in FIG. 1E. The two dielectric patches 102, 104 may be configured to operate in different frequency bands and accordingly, the precise geometries chosen may be varied dependent upon differing design constraints as would be readily understood by one of ordinary skill given the contents of the present disclosure.

As shown in FIGS. 1D and 1E, the top dielectric patch 102 includes alignment features 103 and the bottom dielectric patch 104 includes alignment features 105 that facilitate the alignment of the top dielectric patch 102 with respect to the bottom dielectric patch 104. As illustrated in FIG. 1D, the top dielectric patch 102 alignment features 103 are protrusions while the bottom dielectric patch 104 alignment features 105 are cavities that are sized to fit these protrusions. However, it would be recognized by one of ordinary skill given the contents of the present disclosure that these protrusions/cavities may be reversed in some implementations or may be utilized in combinations in which both the top dielectric patch 102 and bottom dielectric patch 104 each utilizes a combination of protrusions and cavities for each of the top dielectric patch 102 and the bottom dielectric patch 104.

Referring now to FIG. 1C, exemplary dimensional attributes for one exemplary circular patch antenna 100 are shown and described in detail. For example, the top dielectric patch 102 may have a diameter D3 and the bottom dielectric patch 104 may have a diameter D4. In some implementations, dimension D3 may differ slightly from dimension D4 although it would be appreciated that some variants may have a dimension D3 that is equivalent to dimension D4. In one implementation, dimension D3 has a diameter of 59.9 mm, while dimension D3 has a diameter of 60.2 mm. As shown in FIG. 1C, the circular patch antenna 100 may include a plurality of standoffs 107 which assist with the attachment of the circular patch antenna 100 to an external PCB. The circular patch antenna 100 may also include a height dimension H1 that may be 11.8 mm in some implementations. The circular patch antenna 100 may also include a second height dimension H2 that may be 15.7 mm in some implementations. The dimensions described above contribute to the performance characteristics of the circular patch antenna 100 in both dual-feed and quad-feed configurations as set forth in non-limiting example Appendix A.

In some variations, the circular patch antenna 100 may include three (3) or more dielectric patches with an accompanying flex PCB for the circular patch antenna 100 to operate over a wider range of different frequency ranges. In some implementations, a single dielectric patch may be incorporated with an accompanying flex PCB to achieve a specific operating frequency. Such an implementation may be desirable when overall height constraints dictate a lower profile circular patch antenna 100 design. These and other variations would be readily apparent to one of ordinary skill given the contents of the present disclosure.

It will be recognized that while certain aspects of the present disclosure are described in terms of specific design examples, these descriptions are only illustrative of the broader methods of the disclosure and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

The invention claimed is:

1. A circular patch antenna, comprising:
- a first dielectric patch comprising a first plurality of inner and outer feed apertures;
- a top metallization positioned on top of the first dielectric patch;
- a second dielectric patch comprising a second plurality of inner and outer feed apertures;
- the first dielectric patch is positioned over the second dielectric patch;
- wherein the first plurality of inner and outer feed apertures and the second plurality of inner and outer feed apertures are aligned with one another;
- a middle metallization that is positioned between the first dielectric patch and the second dielectric patch, the middle metallization comprising a plurality of arc slots, each of the plurality of arc slots being positioned between the first and second plurality of inner and outer feed apertures and an external periphery of the middle metallization; and
- a bottom metallization that is disposed below the second dielectric patch, the bottom metallization comprising a ground plane for the circular patch antenna.

2. The circular patch antenna of claim 1, wherein the middle metallization comprises two distinct flexible printed circuit boards.

3. The circular patch antenna of claim 2, wherein the second dielectric patch comprises a plurality of slots organized into a plurality of groupings of slots.

4. The circular patch antenna of claim 3, wherein a portion of the plurality of slots are positioned between one of the second plurality of inner feed apertures and one of the second plurality of outer feed apertures.

5. The circular patch antenna of claim 4, wherein the plurality of groupings of slots comprises a first grouping of slots and a second grouping of slots that is disposed adjacent the first grouping of slots, wherein a first arc slot of the plurality of arc slots covers a portion of the first grouping of slots and a portion of the second grouping of slots.

6. The circular patch antenna of claim 5, wherein the first dielectric patch further comprises an inner ring that is positioned about the first plurality of inner feed apertures.

7. The circular patch antenna of claim 6, wherein the first dielectric patch further comprises an intermediate ring that is positioned between the first plurality of inner feed apertures and the first plurality of outer feed apertures.

8. The circular patch antenna of claim 7, wherein the first dielectric patch further comprises one or more outer rings, the one or more outer rings being positioned between the first plurality of inner and outer feed apertures and an outer periphery of the first dielectric patch.

9. The circular patch antenna of claim 8, wherein the first dielectric patch and the second dielectric patch comprise disk-like profiles for an external periphery of the first dielectric patch and the second dielectric patch.

10. The circular patch antenna of claim 9, wherein the first dielectric patch and the second dielectric patch each comprise one or more alignment features that provide alignment between the first dielectric patch and the second dielectric patch when mounted with one another.

11. The circular patch antenna of claim 10, wherein the top metallization comprises a plurality of arc slots.

12. The circular patch antenna of claim 11, further comprising a first plurality of solder pins and a second plurality of solder pins, the first plurality of solder pins being received through both the first dielectric patch and the second dielectric patch, while the second plurality of solder pins is received within the second dielectric patch, but not the first dielectric patch.

13. The circular patch antenna of claim 12, wherein the two distinct flexible printed circuit boards positioned between the first dielectric patch and the second dielectric patch, the top metallization that is disposed atop the first dielectric patch and the bottom metallization that is disposed below the second dielectric patch each comprise a circular outer profile.

14. The circular patch antenna of claim 1, wherein the first dielectric patch further comprises an inner ring that is positioned about the first plurality of inner feed apertures.

15. The circular patch antenna of claim 14, wherein the first dielectric patch further comprises an intermediate ring that is positioned between the first plurality of inner feed apertures and the first plurality of outer feed apertures.

16. The circular patch antenna of claim 15, wherein the first dielectric patch further comprises one or more outer rings, the one or more outer rings being positioned between the first plurality of inner and outer feed apertures and an outer periphery of the first dielectric patch.

17. The circular patch antenna of claim 1, wherein the second dielectric patch comprises a plurality of slots organized into a plurality of groupings of slots.

18. The circular patch antenna of claim 17, wherein the second plurality of inner and outer feed apertures comprises four sets of a single inner feed aperture and a single outer feed aperture.

19. The circular patch antenna of claim 18, wherein each of the plurality of groupings of slots are positioned between two of the four sets of the single inner feed aperture and the single outer feed aperture.

20. The circular patch antenna of claim 19, wherein each grouping of slots of the plurality of groupings of slots consist of six distinct slots.

* * * * *